United States Patent

[11] 3,626,504

[72] Inventor Martinus Johannes Holl
La Lande Patry, France
[21] Appl. No. 6,785
[22] Filed Jan. 29, 1970
[45] Patented Dec. 7, 1971
[73] Assignee U.S. Philips Corporation
New York, N.Y.
[32] Priority Jan. 29, 1970
[33] France
[31] 6901746

[54] RECORD PLAYER
6 Claims, 3 Drawing Figs.

[52] U.S. Cl. .......... 274/1 L, 274/14
[51] Int. Cl. .......... G11b 17/00
[50] Field of Search .......... 274/1 L, 10 R, 14, 15, 22

[56] References Cited
FOREIGN PATENTS
715,141 9/1954 Great Britain .......... 274/1 L

*Primary Examiner*—Leonard Forman
*Assistant Examiner*—Charles E. Phillips
*Attorney*—Frank R. Trifari

ABSTRACT: A record player suitable for playing records having the standard diameters of 30, 25 and 17 cm. and records having diameters smaller than 13 cm., in particular a diameter of 10 cm. The record player of the invention has an automatic switch-off mechanism of the type comprising a displaceable trip lever which, when a record is being played, is moved by the moving tone arm into the path of a projection which is eccentrically provided on the turntable. The trip lever is periodically moved back by this projection, but when the pickup needle moves into the runout groove of a record it is displaced a larger distance by a control element so that the projection grips the lever to impart an additional displacement to it, which causes automatic switch-off. The record player includes an abutment pin which, in order to enable records having diameters smaller than 13 cm. to be played, can be so operated by the person using the record player that, when the tone arm is set on the record, the control element is temporarily blocked so that contact with the trip lever is postponed in order to prevent premature switching off.

Figure 1:
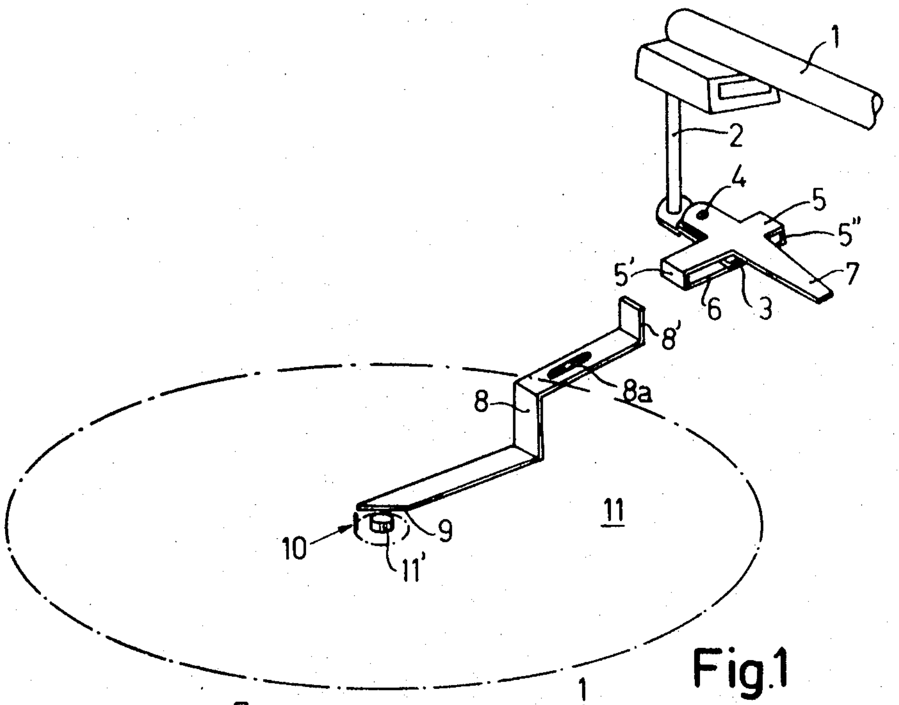

INVENTOR.
MARTINUS J. HOLL
BY
AGENT

INVENTOR.
MARTINUS J. HOLL
BY
AGENT

RECORD PLAYER

The present invention relates generally to the art of phonograph record players, and particularly to a record player capable of playing records having a diameter smaller than the present standard diameters.

Record players of the type to which the present invention is directed include a turntable which is mounted for rotation on a first spindle and to which is connected an element which is provided with a projection which on rotation of the turntable describes a closed path. A tone arm which holds a pickup needle to the turntable spindle. A control element is arranged to move in a plane parallel to the turntable and a friction coupling is provided between the control element and the rotatable assembly of the tone arm and its mounting spindle and through which the movement of the arm can be transmitted to the control element and the movement of the control element can be affected. A trip lever is arranged to be displaced in a plane parallel to the turntable and is formed with a first abutment face which can be moved into the path of the said projection and with a second abutment face arranged to cooperate with the control element.

Record players of this type are known and are suitable for playing gramophone records having standard diameters of 30, 25 and 17 cm. They are designed so that they switch off automatically when the needle enters the leadout groove of the record. For this purpose the diameter on which the beginning of the runout groove is situated is the same for all records of the said types and has a standardized size of about 13 cm. The tripping process is initiated when the movement of the needle in the groove of a record causes the control element, which is driven by the tone arm to engage on abutment face of the trip lever so that the lever is displaced into the path of the projection on the element connected to the turntable. At each revolution of the turntable, this projection periodically moves back the lever and the control element engaging the lever. When the needle enters the runout groove of the record, the arm and hence the control element will perform an accelerated inward movement so that the control element displaces the lever through a greater distance than is normal thus causing the lever to initiate a switchoff function.

Known record players having this type of switch off function are unsuited to play records having a diameter smaller than the above-mentioned standardized runout groove diameter, in particular records having a diameter of 10 cm. which recently have come into the market; for if one should want to set the needle at the beginning of the sound groove of such a record, the above-described switchoff operation will be performed when the arm is manually moved inward, so that the record player is switched off before playing can commence.

It is an object of the present invention to obviate the disadvantage of the known record players and to provide a record player suitable for playing both records having the standard diameters of 30, 25, and 17 cm. and records having a diameter smaller than about 13 cm, in particular a diameter of 10 cm.

For this purpose, the record player is provided with means adapted to be optionally operated during the setting of the tone arm on the record so that when it is operated, movement of the control element will be counteracted to temporarily prevent the switching off function.

Provisions of the means according to the invention enables the person using the record player, if records having a diameter smaller than 13 cm. are to be played, to postpone engagement of the control element with the abutment face of the trip lever until at least after the needle has been placed at the beginning of the record. This will prevent the record player from being prematurely switched off.

In a suitable embodiment of the invention, the said means are designed so that in their operative condition they disengage a frictional coupling between the control element and the spindle of the tone arm. When the tone arm holding the needle is manually set in a comparatively small-diameter record at the beginning of the spiral groove, the mechanism of the invention prevents the control element from also being swung inward, which swinging movement would cause the record player to be prematurely switched off. Preferably the said means according to the invention comprise an abutment stop which in the operative condition lies in the path of the frictionally driven control element and thereby blocks the inward movement of the control element. Thus, the said inward swinging movement of the control is effectively counteracted. When a record having a comparatively small diameter, for example a diameter of 10 cm., is to be played, the tone arm must be raised to an extent such that an abutment pin is depressed, after which the arm in its raised position is is swung inward, during which movement the control element is maintained inoperative by the depressed abutment pin. When the needle is lowered into the run-in groove of the record, the abutment pin springs back and the control element is released, after which the usual tripping and switch off processes may take place.

If the operator would raise the tone arm only after the arm has already travelled part of the inward swinging movement, the extension of the control element might already be located beneath the abutment pin so that the pin when being depressed strikes this extension. In order to obviate fracture of components due to such incorrect operation, according to the invention the extension preferably is a leaf spring.

Figure 3:
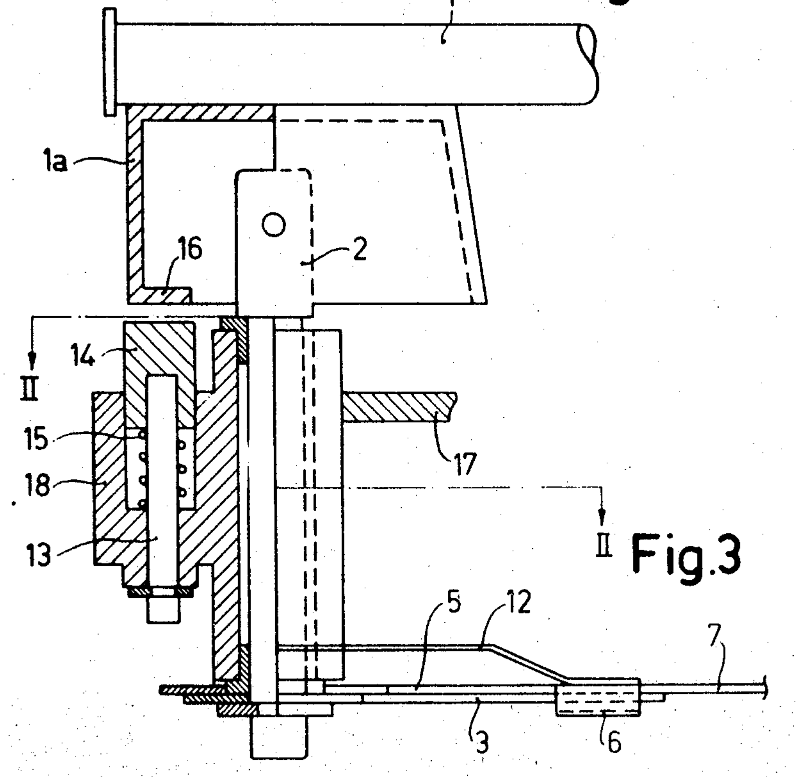
Figure 2:
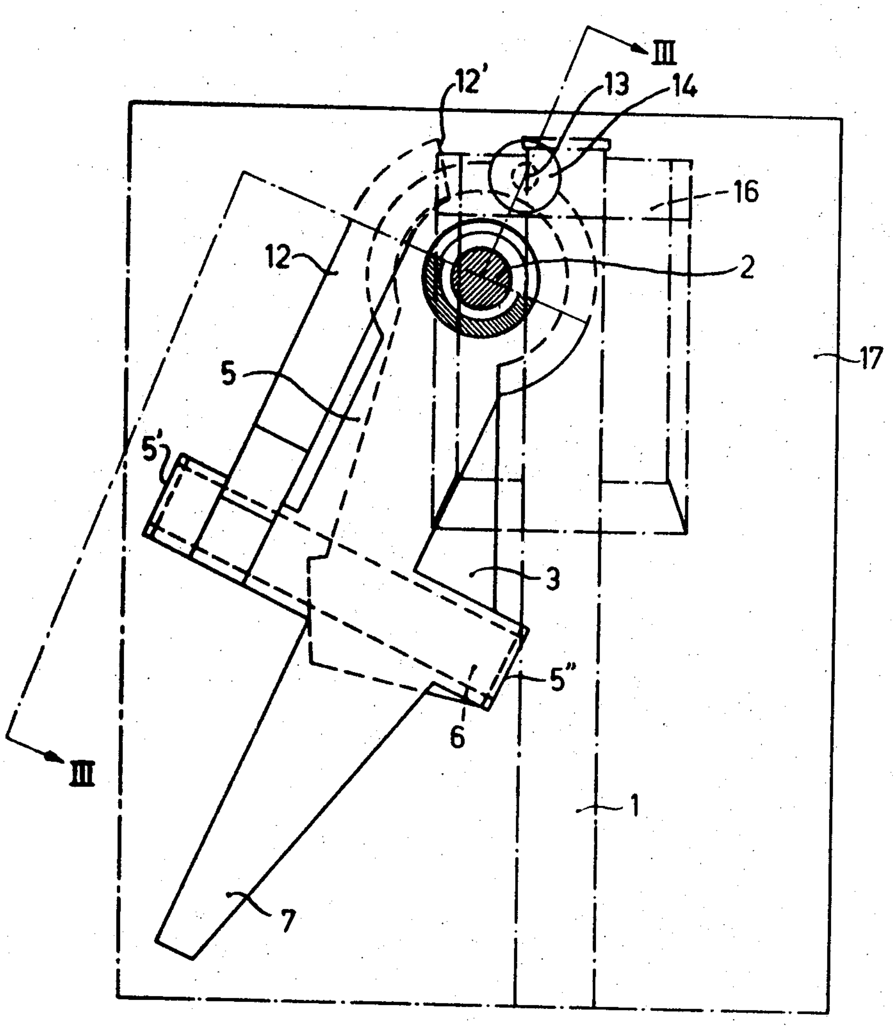

An embodiment of the invention will now be described, by way of example, with reference to the accompanying diagrammatic drawings, in which FIG. 1 is a perspective view of some component parts of known record player, FIG. 2 is a sectional plan view of an embodiment of a record player according to the invention, taken on the line II—II of FIG. 3, and FIG. 3 is a part elevation, part sectional view taken on the line III—III of FIG. 2.

A known record player of which FIG. 1 shows only those components which are considered important for an understanding of the invention, includes a tone arm 1 which holds a pickup needle (not shown). The arm 1 is mounted on a spindle 2 in a manner such that it can pivot freely in a vertical plane, but on rotation in a horizontal plane it causes the spindle 2 to rotate with it. An arm 3 is rigidly secured to the free lower end of the spindle 2, and a straplike control element 5 is pivotable about a pin 4 disposed on the arm 3. The pivotal movement of the strap element 5 relative to the arm 3 is limited by two bent-over lugs 5′ and 5″ of the element 5. A leaf spring 6, the ends of which are each secured to one of the lugs 5′ and 5″, presses the element 5 and the arm 3 together and thus forms a friction coupling between the arm 3 and the element 5 by means of which the movement of the tone arm 1 can be transmitted to the element 5 and the pivotal movement of this element can be effected. A tag 7 of the element 5 is arranged to engage an abutment face 8′ formed at one end of a trip lever 8. The trip lever 8, which is pivotable about a fixed pivot point 8*a*, has an abutment face 9 at its other end arranged to cooperate with a projection 10 which is eccentrically disposed on the lower surface of the turntable 11, which is shown schematically by a dot-dash line and is rotatable about a spindle 11′.

The spindles 11′ and 2 are arranged parallel to one another, and the arm 3, the straplike element 5 and the trip lever 8 move in planes parallel to the turntable.

Since in playing a record the pickup needle follows the groove of the record, the tone arm 1 pivots inward so that the spindle 2 is rotated. As a result the arm 3 and the control element 5 driven by it also move inward, so that the tag 7 engages the abutment face 8′ of the lever 8 and the lever is displaced through a distance such that the abutment face 9 is moved into the path of the projection 10. At each revolution of the turntable, this projection periodically moves back the lever 8 and the control element 5 in engagement therewith. When the needle reaches the runout groove of the record, the tone arm 1 and hence the control element 5 will perform an accelerated inward movement, the tag 7 of the control element 5 displacing the lever through a larger trajectory so that the projection 10 grips the lever 8 and moves it through a distance such that the lever engages, for example, an electric switch (not shown) of the player and thus can perform a switch off function.

The embodiment of a record player according to the invention shown in FIGS. 2 and 3 again includes the tone arm 1, the mounting spindle 2, the arm 3 rigidly mounted on the spindle 2, the control element 5 and the leaf spring 6 which presses the arm 3 and the element 5 together and thus provides a friction coupling between the arm and the element. Unlike the case in FIG. 1, in the embodiment shown in FIGS. 2 and 3 the control element 5 is mounted for rotation about the spindle 2.

To the control element 5 there is secured a leaf spring 12 which as will be seen in particular from FIG. 2, extends along the mounting spindle 2 of the tone arm 1 at the side facing the turntable. At the end of the tone arm 1 remote from the pickup needle there is journaled in a bushing 18 of the mounting plate 17 of the record player an abutment pin 13 which is provided with a push portion 14, is arranged parallel to the spindle 2 and is adapted to be depressed against the action of a spring 15. The leaf spring 12 is bent so that its free end 12′ lies within the operating range of the abutment pin when this pin is depressed from the position shown in FIG. 3.

The tone arm is secured to a hollow casing 1*a* which at its lower surface facing push portion 14 of the pin 13 has an inwardly bent wall portion 16.

When the tone arm 1 is raised a certain distance in a vertical plane, the wall portion 16 of the casing 1*a* can be engaged with a push portion 14 and the pin 13 can be depressed against the spring action. When the tone arm in this raised position is manually swung inward (to the left in FIG. 2), the free end 12′ of the leaf spring 12 secured to the control element 5 abuts the depressed abutment pin 13 so that the effect of the friction coupling between the arm 3, which follows the movement of the tone arm, and the control element 5 is suppressed. Thus, the element 5 remains behind and the tag 7 of the element 5 is prevented from engaging the abutment face 8′ (see FIG. 1) of the trip lever 8. The element 5 remains blocked until the abutment pin 13 is released, which takes place when the tone-arm is lowered and the pickup needle is set into the run-in groove of a record.

For playing records having the standard diameters of 30, 25 and 17 cm., the record player shown in FIGS. 2 and 3 operates similarly to the known record player shown in FIG. 1. The tone arm is normally raised a small distance and the needle is set into the run-in groove of such a record. If records having a diameter of, say, 10 cm. are to be played, the tone arm is raised higher than is normally the case and the needle is moved to a point over the run-in groove of such a record in this raised position. During this swinging movement in the raised position of the arm the control element 5 is rendered inoperative by the depressed abutment pin 13. When the needle is set into the run-in groove, the control element 5 is released so that the usual tripping and switchoff operations can take place.

It should be noted that the invention is not restricted to the above-described embodiments shown in the drawing, but that many modifications are possible without departing from the scope of the invention. The embodiment described, the friction coupling between the arm 3 and the control element 5 is provided by the leaf spring 6 which urges them to one another. However, this leaf spring is not essential to the present invention. If desired, the friction coupling may be provided by the weight of the element 5 pressing on the arm 3 so that the control element is made to follow any movement of the arm. In such an embodiment the control element may take the form of a flat plate-shaped element. Friction material may then be provided between the arm and the element. Also, embodiments are possible in which the abutment pin is not operated by the arm itself, but by a separate operating button through a suitable transmission. If desired, the abutment pin may be a pin which is removable from the record player and which, when records having comparatively small diameters are to be played, is inserted into the player so as to extend into the path of the control element 5.

What is claimed is:

1. A record player comprising a turntable rotatably mounted on a record spindle, a tone arm spindle rotatably mounted on the player and arranged parallel to said record spindle, a tone arm for carrying a pickup needle at one end thereof pivotally mounted at its other end on said tone arm spindle so that as said tone arm is moved inwardly with respect to the center of the turntable said tone arm spindle will rotate with said tone arm, a control element connected via a disengageable friction coupling to said tone arm spindle so that when said friction coupling is engaged said control element will rotate in a plane parallel to said turntable with said tone arm spindle when it rotates, a trip lever mounted on said player and beneath said turntable for pivotal and longitudinal movement in a plane parallel to said turntable, an abutment face attached to one end of said trip lever arranged for engagement with said control element when said control element is rotated toward the center of said turntable in response to movement of said tone arm so as to displace said lever, means mounted on said turntable for periodically engaging the other end of said trip lever when said trip lever is displaced by said control element so that when said control element reaches a predetermined distance from the center of said turntable said trip lever will be displaced by said means to initiate a switching-off function, and a manually operable release mechanism mounted on said player for disengaging said friction coupling when said mechanism is operated so that as said tone arm is moved toward the center of said turntable so as to be set at the beginning of a record on the turntable said control element will not rotate therewith thereby preventing said lever from initiating the switching-off function.

2. The record player according to claim 1 wherein said release mechanism comprises an abutment stop which when said mechanism is manually operated will be moved into the path of said control element to thereby block the inward movement of the control element.

3. The record player according to claim 2 further comprising an abutment pin removably mounted on said player for actuating said release mechanism.

4. The record player according to claim 1 wherein said release mechanism comprises a housing mounted on said player, an abutment pin movably mounted within said housing and arranged parallel to said tone arm spindle, means engaging said pin when said tone arm is tilted away from said turntable so that said pin will be moved into the path of said control element so as to thereby block the inward movement of said control element, and spring means for returning said abutment pin when said tone arm is returned to its operative position.

5. The record player according to claim 4 further comprising an abutment face connected to the lower surface of said tone arm at the end thereof opposite the pickup needle, said abutment face arranged for engagement with said abutment pin, an extension member connected to said control element which extends past said tone arm spindle on a side thereof between said spindle and said turnable and engageable by said abutment pin, so that when said abutment pin is operated by the upward pivotal movement of one tone arm to cause the abutment face thereof to engage said abutment pin said extension member will be caused to operate so as to disengage said friction coupling.

6. The record player according to claim 5 wherein said extension member is a leaf spring mounted on said control element.

* * * * *

PO-1050
(5/69)

UNITED STATES PATENT OFFICE
CERTIFICATE OF CORRECTION

Patent No. 3626504 Dated December 7, 1971

Inventor(s) MARTINUS JOHANNES HOLL

It is certified that error appears in the above-identified patent and that said Letters Patent are hereby corrected as shown below:

Col. 1, line 12 after "dle" insert --is mounted on a second rotatably mounted spindle arranged parallel--

Signed and Sealed this 31st day of October 1972

(SEAL)
Attest:

EDWARD M.FLETCHER,JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3626504 Dated December 7, 1971

Inventor(s) MARTINUS JOHANNES HOLL

It is certified that error appears in the above-identified patent and that said Letters Patent are hereby corrected as shown below:

In the heading, under "Priority","Jan. 29, 1970" should read --Jan. 29, 1969--

Signed and sealed this 20th day of February 1973.

(SEAL)
Attest:

EDWARD M.FLETCHER,JR.
Attesting Officer

ROBERT GOTTSCHALK
Commissioner of Patents